United States Patent
Chen et al.

(10) Patent No.: US 7,961,994 B2
(45) Date of Patent: Jun. 14, 2011

(54) OPTICAL INTERFACE ASSEMBLY

(75) Inventors: Wei Chen, Ellicott City, MD (US); Brent E. Little, Glen Head, NY (US)

(73) Assignee: Infinera Corporation, Sunnyvale, CA (US)

( * ) Notice: Subject to any disclaimer, the term of this patent is extended or adjusted under 35 U.S.C. 154(b) by 124 days.

(21) Appl. No.: 12/239,940

(22) Filed: Sep. 29, 2008

(65) Prior Publication Data

US 2010/0080503 A1 Apr. 1, 2010

(51) Int. Cl.
*G02F 1/135* (2006.01)
*G02F 1/136* (2006.01)
*G02F 1/1343* (2006.01)

(52) U.S. Cl. .......... 385/29; 385/27; 385/39; 385/50
(58) Field of Classification Search .......... 385/27–30
See application file for complete search history.

(56) References Cited

U.S. PATENT DOCUMENTS

| 6,718,094 | B1* | 4/2004 | Devaux et al. ............ 385/39 |
| 6,819,838 | B2* | 11/2004 | Devaux et al. ............ 385/39 |
| 7,054,523 | B2* | 5/2006 | Takahashi et al. ......... 385/28 |
| 7,539,378 | B2* | 5/2009 | Takabayashi et al. ...... 385/40 |
| 2003/0091287 | A1* | 5/2003 | Lam et al. ............... 385/40 |
| 2003/0152324 | A1* | 8/2003 | Betty et al. .............. 385/29 |
| 2003/0174954 | A1* | 9/2003 | Hamamoto et al. ........ 385/39 |

* cited by examiner

*Primary Examiner* — Rhonda S Peace
(74) *Attorney, Agent, or Firm* — David L. Soltz; Harrity & Harrity, LLP (57) ABSTRACT

An optical device includes a first waveguide having an end portion configured to receive an optical signal, the optical signal having a fundamental mode; a second waveguide having an end portion spaced from the end portion of the first waveguide; and a cladding layer surrounding the first and second waveguides. The first waveguide is configured such that the optical signal undergoes multimode interference to focus the fundamental mode at the end portion of the second waveguide.

21 Claims, 6 Drawing Sheets

OPTICAL INTERFACE ASSEMBLY

BACKGROUND

Transmission of optical signals (i.e., light) between different optical components requires efficient interface devices designed to facilitate the transmission of light without loss in power or leakage between elements. In general, it is desired to transfer light from a source waveguide on the source chip or from a source optical fiber into a receiving waveguide on the receiving chip or fiber, with low power loss or leakage. Waveguides on both the source and receiving chips typically have thin dimensions, and when the light is emitted out of either waveguide, it quickly diffracts in the vertical direction, typically as a Gaussian beam. This diffraction causes the exiting light to distribute optical power quickly in a vertical direction. Any gap between the two devices allows for increased divergence.

In order to mitigate such diffraction losses, the waveguides of the two optical devices would need to be brought into sub-micron proximity in order to eliminate any inter-device gap. Unfortunately, sub-micron gaps are not generally feasible due to a number of reasons, such as surface perturbations and non-uniformities in manufacturing tolerances, mechanical alignment accuracies, and interposing glue that necessarily fills the gap between the two chips that are to be bonded.

To overcome these deficiencies, lens-based and mode transforming adapters have been used to collect the diffracted light and focus it from one waveguide into the other. Unfortunately, these types of adapters are not easily fabricated in certain material systems, such as in indium phosphide compounds, where it is costly and cumbersome to etch and regrow materials repeatedly.

SUMMARY

According to one implementation, an optical device includes a first waveguide having an end portion configured to receive an optical signal, the optical signal having a fundamental mode; a second waveguide having an end portion spaced from the end portion of the first waveguide; and a cladding layer surrounding the first and second waveguides. The first waveguide is configured such that the optical signal undergoes multimode interference to focus the fundamental mode at the end portion of the second waveguide.

According to another implementation, a planar lightwave circuit (PLC) having an input end for receiving light from a source optical device may include a substrate; a first cladding layer formed on the substrate; a multimode interference portion provided on the first cladding layer and having an input end and an output end, where the input end of the multimode interference region is configured to receive an optical signal, and where the multimode interference portion has an output end that supplies a portion of the optical signal; a waveguide formed on the first cladding layer, the waveguide being configured to receive the portion of the optical signal; and a second cladding layer provided on the multimode interference portion and the waveguide.

According to yet another implementation, a planar lightwave circuit (PLC) having an input end for receiving light from a source optical device may include a substrate; a first cladding layer formed on the substrate; a first reflective layer formed on the first cladding layer; a multimode interference portion formed on the first reflective layer and having an input end and an output end, where the input end of the multimode interference region is configured to receive an optical signal, and where the multimode interference portion has an output end that supplies a portion of the optical signal, where the multimode interference portion has a height and a length; a waveguide provided on the first cladding layer, the waveguide being configured to receive the portion of the of the optical signal, where the waveguide has a refractive index higher than a refractive index of the multimode interference portion; a second reflective layer formed on the multimode interference portion; and a second cladding layer provided on the waveguide.

DETAILED DESCRIPTION

The following detailed description refers to the accompanying drawings. The same reference numbers in different drawings may identify the same or similar elements. Also, the following detailed description does not limit the invention. Instead, the scope of the invention is defined by the appended claims and equivalents.

Overview

Systems and methods consistent with aspects described herein may provide improved optical interface assemblies for enabling efficient optical transitions between optical devices having different indexes of reflection. In one embodiment, a first optical waveguide may be coupled to a second optical waveguide via a multimode interference (MMI) lens assembly. By using a MMI lens assembly, a high efficiency and tolerant transition may be provided with a significantly lower cost than conventional alternatives. In a second embodiment, a first optical waveguide may be coupled to a second optical waveguide via an optical reflection lensing region. More particularly, one or more reflective layers may be provided, for example, above and below a low index multimode interference region adjacent to the receiving optical waveguide to direct dispersed light from the first optical waveguide into a core area of the receiving optical waveguide.

Multimode Interference (MMI) Lens Assembly

Figure 1A:
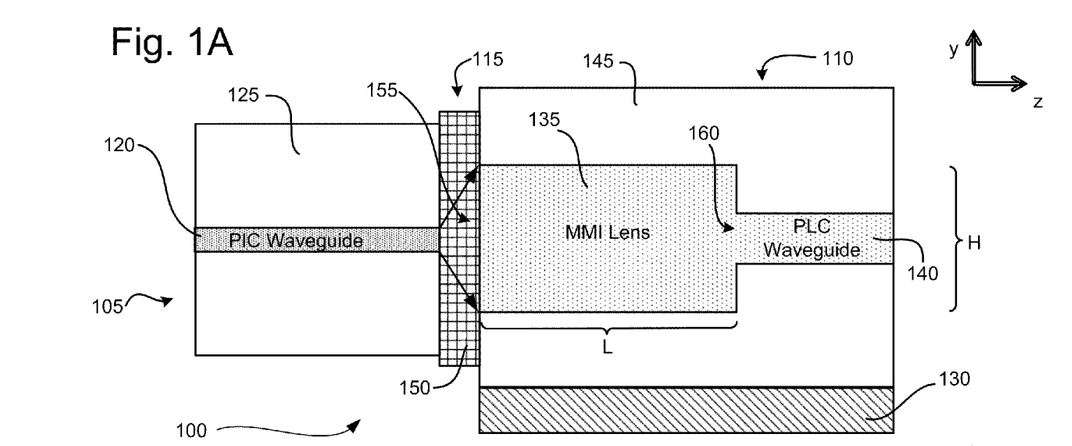
FIGS. 1A and 1B are block diagrams illustrating side and top views, respectively, of an exemplary optical interface assembly in which systems and methods described herein may be implemented.
Figure 1B:
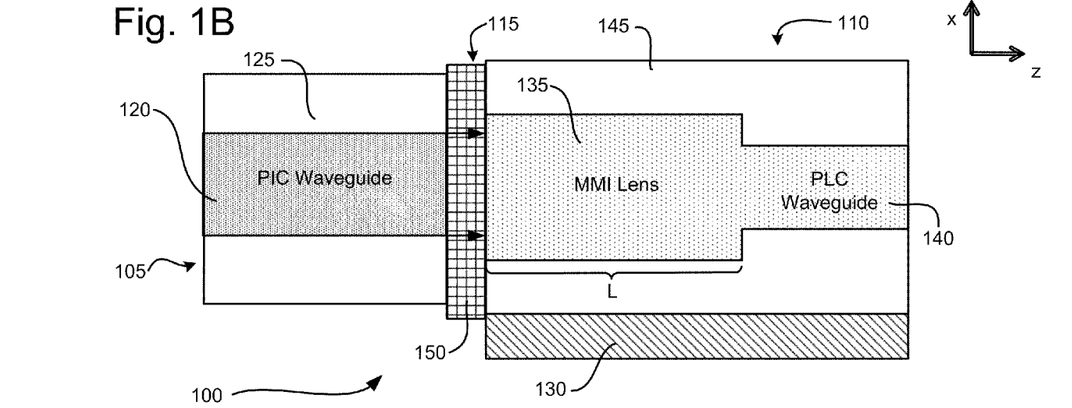

FIGS. 1A and 1B are block diagrams illustrating side and top views, respectively, of an exemplary optical interface assembly 100 in which systems and methods described herein may be implemented. As illustrated, optical interface assembly 100 may include a source optical device 105 and a receiving optical device 110 separated by a gap 115. Source optical device 105 may include a source waveguide 120 and source cladding 125. Receiving optical device 110 may include a substrate 130, a MMI lens assembly 135, a receiving waveguide 140, and receiving cladding 145.

In one implementation, source optical device 105 may include an optical chip assembly, such as a photonic integrated circuit (PIC). Source waveguide 105 may include a dielectric material longitudinally formed in the core of source optical device 105. Source waveguide 120 may be surrounded by source cladding 125 that is formed of materials having reflective indices that are lower than source waveguide 120, and where the peak optical intensity of source optical device 105 resides in source waveguide 105.

Receiving optical device 110 may include an optical chip assembly, such as a planar lightwave circuit (PLC). PICs are distinguished from PLCs in that PICs generally include active optical components that include waveguides having relatively high refractive indices (e.g., on the order of approximately 3.4), whereas PLCs are generally passive optical components that include waveguides having relatively low refractive indices (e.g., on the order of approximately 1.7).

As shown in FIGS. 1A and 1B, source optical device 105 and receiving optical device 110 may be separated by gap 115. As described above, light emitted from source waveguide 120 may be diffracted an amount dictated by the width of gap 115 and any material included in gap 115. In one implementation, gap 115 may be filled with an epoxy or other bonding material 150 used to fix the position of source optical device 105 relative to receiving optical device 110. In addition to any diffraction caused by gap 115, the refractive index of bonding material 150 (e.g., approximately 1.5 for epoxy) may also effect the diffraction of light emitted from source waveguide 120.

Substrate 130 in receiving optical device 110 may form a carrier onto which various dielectric layers of receiving optical device 110 may be deposited or grown during formation of receiving optical device 110. Substrate 130, for example, may include silicon, quartz, or indium phosphide, or any combination thereof.

MMI lens assembly 135 may include a material having a refractive index substantially similar to the refractive index of receiving waveguide 140 (e.g., approximately 1.7). In addition, the height (H) and length (L) of MMI lens assembly 135 may be determined such that Gaussian distributed light incident at input end 155 of receiving optical device 110 may be focused into its fundamental mode at input end 160 of receiving waveguide 140. Receiving waveguide 140 may be formed substantially vertically centered with respect to an output end of MMI lens assembly 135.

Receiving cladding 145 may be formed of a material having a lower refractive index than the refractive index of MMI lens assembly 135 and receiving waveguide 140 (e.g., approximately 1.45) and where the peak optical intensity of receiving optical device 110 resides in MMI lens assembly 135 and receiving waveguide 140.

In one implementation consistent with embodiments described herein, MMI lens assembly 135 and receiving waveguide 140 may be formed as a thin film of dielectric material, such as silica, indium phosphide, gallium arsenide, high index polymers, and other material suitable for making optical waveguides including combinations thereof MMI lens assembly 135 and receiving waveguide 140 may be deposited on a receiving cladding 145. Receiving cladding material 145 may be selected from a group that includes silica, lower index silicon oxynitride, lower index silicon oxycarbide, galium arsenide, indium phosphide, lower index polymers, etc. including combinations thereof.

Although the embodiment of FIGS. 1A and 1B is described in relation to optical signal transmission from source optical device 105 to receiving optical device 110, it should be understood that the embodiments described herein may also transmit in a reciprocal direction of transmission (e.g., from receiving waveguide 140 through MMI lens assembly 135, across gap 115 and into source waveguide 120.

Figure 2A:
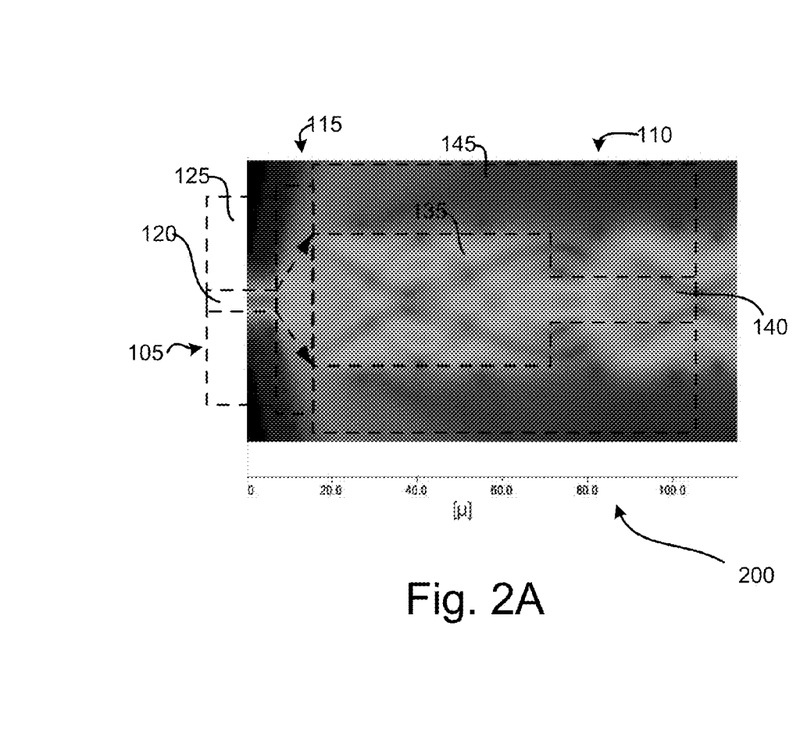
FIGS. 2A and 2B illustrate side and top views, respectively, of simulation results corresponding to a first exemplary embodiment of the optical interface assembly of FIGS. 1A and 1B.
Figure 2B:
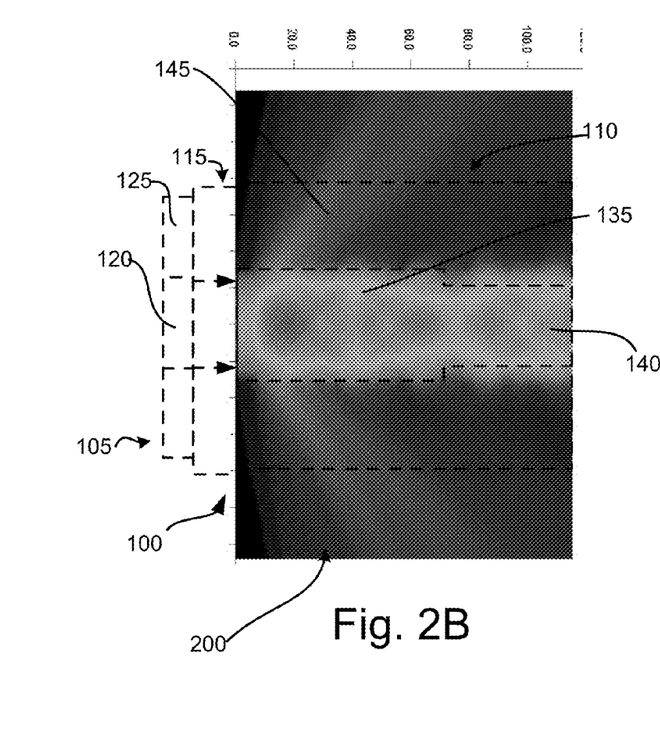

As discussed above, a height (H) and length (L) of MMI lens assembly 135 may be determined such that Gaussian distributed light incident at input end 155 of receiving optical device 110 may be focused into its fundamental mode at input end 160 of receiving waveguide 140. In one exemplary implementation, a suitable height and length of MMI lens assembly 135 may be determined by performing a numerical modeling analysis of a proposed configuration. FIGS. 2A and 2B illustrate side and top views, respectively, of exemplary simulation results 200 corresponding to optical interface assembly 100 having defined criteria. In one implementation, the simulation may be performed via a beam propagation model (BPM), however, any suitable simulation method may be used, such as the finite difference time domain (FDTD) method, the finite element method, the split-step method, the transfer-matrix method, or the eigenmode expansion method.

FIG. 2A illustrates the field magnitude along a side view of optical interface assembly 100, while FIG. 2B illustrates the field magnitude along a top view of optical interface assembly 100. For purposes of explanation, the structure of a resulting optical interface assembly 100 that conforms to simulation results 200 has been superimposed in dashed lines over simulation results 200.

In the example of FIGS. 2A and 2B, source waveguide 120 has a height of 0.6 microns (μm), a width of about 2 μm, and a refractive index of 3.35. Gap region 115 (including bonding material 150) has refractive index of 1.5 and a width of 10 μm. MMI lens assembly 135 and receiving waveguide 140 each have a refractive index of 1.70. MMI lens assembly 135 has a height (H) of 6 μm. The receiving cladding material has a refractive index of about 1.45. The optical wavelength used in the simulation is 1.55 μm.

As shown in FIG. 2A, simulation results 200 illustrate various regions of destructive and constructive interference within MMI lens assembly 135. Further, simulation results 200 demonstrate that a fundamental mode of the light received by MMI lens assembly 135 is focused at a length of about 73 μm (as measured from the input end 155 of receiving optical device 110). Accordingly, MMI lens assembly 135 may be coupled to receiving waveguide 140 at a length of 73 μm, thereby focusing a majority of the optical power to input end 160 of receiving waveguide 140. In the example of FIGS. 2A and 2B, approximately 80% of the optical power is transferred from source waveguide 120 to receiving waveguide 140.

Figure 3A:
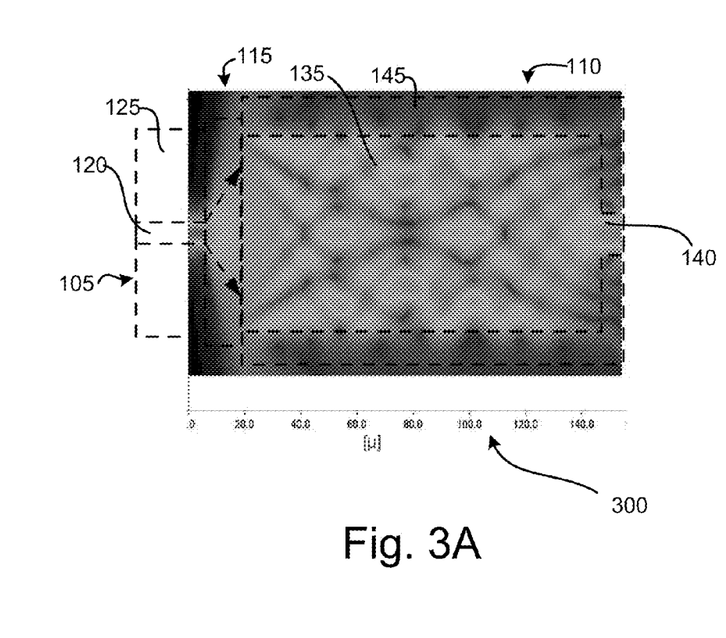
FIGS. 3A and 3B illustrate side and top views, respectively, of simulation results corresponding to a second exemplary embodiment of the optical interface assembly of FIGS. 1A and 1B.
Figure 3B:
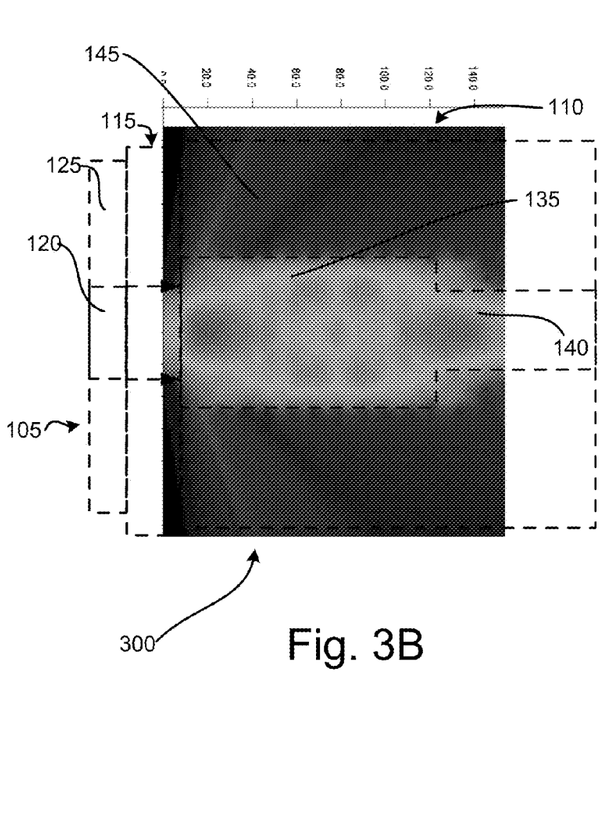

FIGS. 3A and 3B illustrate side and top views, respectively, of exemplary simulation results 300 corresponding to an optical interface assembly 100 having different defined criteria. In the example of FIGS. 3A and 3B, source waveguide 120 has a height of 0.6 μm, a width of about 2 μm, and a refractive index of 3.35. Gap region 115 has refractive index of 1.5 and a width of about 10 μm. MMI lens assembly 135 and receiving waveguide 140 each has a refractive index of 1.70. MMI lens assembly 135 has a height (H) of 9 μm. The receiving cladding material has a refractive index of 1.45. The optical wavelength used in the simulation is 1.55 μm.

As shown in FIG. 3A, simulation results 300 demonstrate that a fundamental mode of the light received by MMI lens assembly 135 meeting the above-described criteria is focused at a length of about 150 μm as measured from input end 155 of receiving optical device 110. Accordingly, MMI lens assembly 135 may be coupled to receiving waveguide 140 at a length of 150 μm, thereby focusing a majority of the optical power to receiving waveguide 140. In the example of FIGS. 3A and 3B, approximately 80% of the optical power is transferred from source waveguide 120 to receiving waveguide 140.

Figure 4:
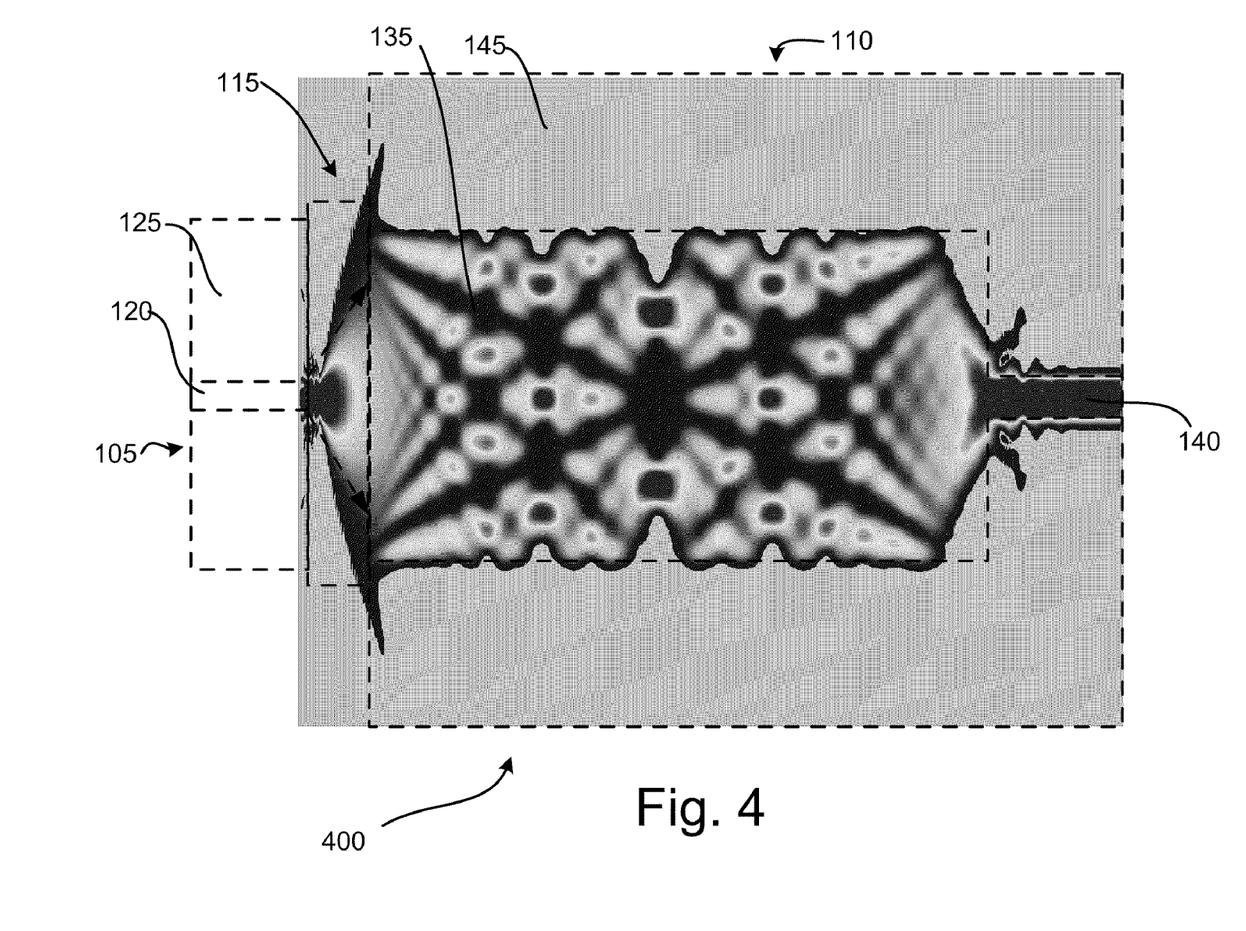
FIG. 4 illustrates a side view of simulation results corresponding to a third exemplary embodiment of the optical interface assembly of FIG. 1A.

FIG. 4 is another exemplary simulation result 400 corresponding to optical interface assembly 100. For this simulation, source waveguide 120 has a height of 0.6 μm, and a refractive index of 3.35. Gap region 115 has refractive index of 1.5 and a width of about 12.5 μm. MMI lens assembly 135 and receiving waveguide 140 have a refractive index of 1.70. MMI lens assembly 135 has a height (H) of 12 μm. The receiving cladding material has a refractive index of 1.45. The optical wavelength used in the simulation is 1.55 μm.

As shown in FIG. 4, simulation results 400 demonstrate that a fundamental mode of the light received by MMI lens assembly 135 is focused at a length of about 235 μm. Accordingly, MMI lens assembly 135 may be coupled to receiving waveguide 140 at a length of 235 μm, as measured from input end 155 of receiving optical device 110, thereby focusing a majority of the optical power to receiving waveguide 140. In the example of FIG. 4, approximately 80% of the optical power is transferred from source waveguide 120 to receiving waveguide 140.

Although an optimal length of MMI lens assembly 135 may be determined through simulation analysis as described above in relation to FIGS. 2A-4, an alternative implementation may include mathematically determining a length of MMI lens assembly 135 based on desired characteristics of source waveguide 120 and receiving waveguide 140. In one exemplary implementation, a length (L) and/or height (H) for MMI lens assembly 135 may be estimated based on the following expression:

$$L = 2pi/(beta_0 - beta_1),$$

where $beta_0$ and $beta_1$ are propagation constants of the two lowest order optical modes supported by defined waveguide geometry and refractive indices.

By using a MMI lens assembly to focus optical power from a source waveguide (e.g., waveguide 120) to a receiving waveguide (e.g., waveguide 140), a low-cost, highly efficient optical device interface assembly may be provided.

Reflective Layer Lensing

Figures 5, 6:
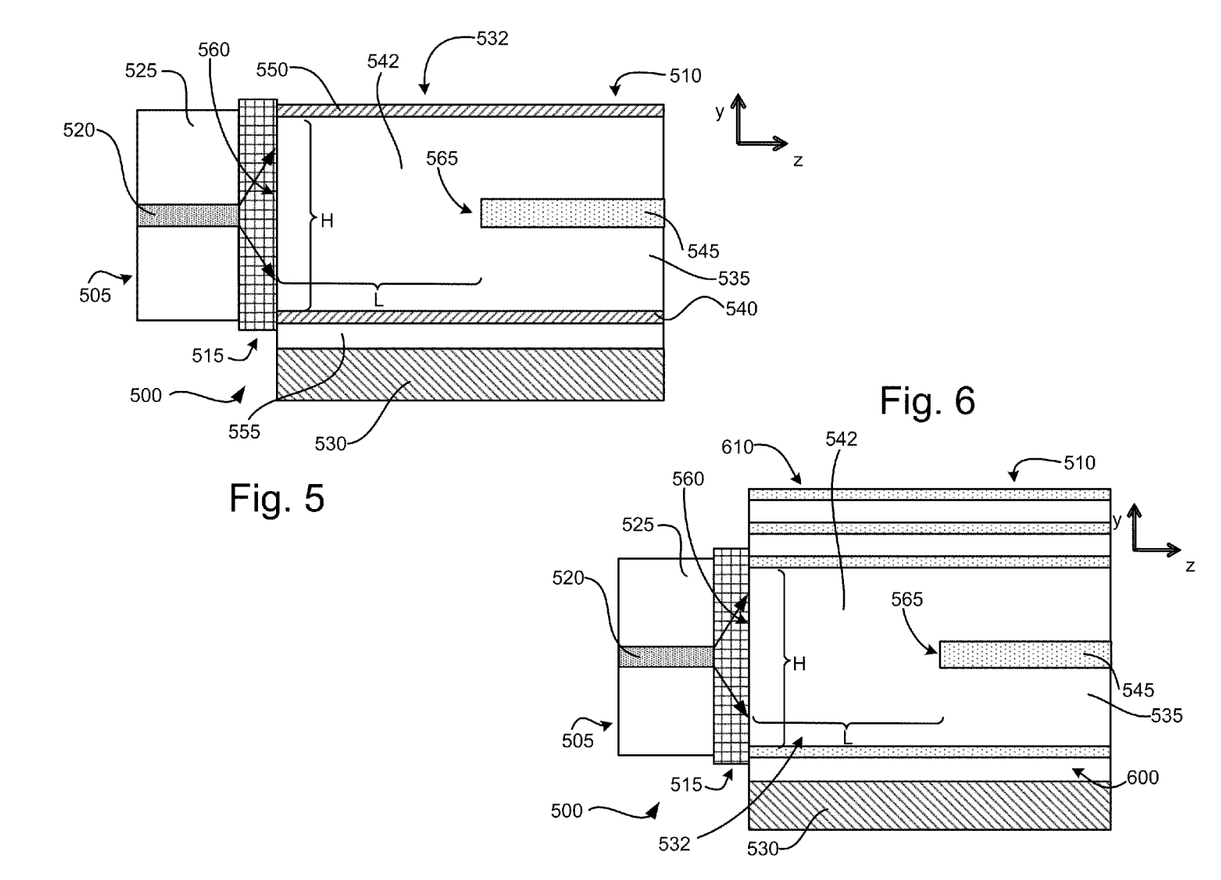
FIG. 5 is a block diagram illustrating a side view of another exemplary optical interface assembly in which systems and methods described herein may be implemented.
FIG. 6 is a block diagram illustrating a side view of yet another exemplary optical interface assembly in which systems and methods described herein may be implemented.

FIG. 5 is a block diagram illustrating a side view of another exemplary optical interface assembly 500 in which systems and methods described herein may be implemented. As illustrated, optical interface assembly 500 may include a source optical device 505 and a receiving optical device 510 separated by a gap 515. Source optical device 505 may include a source waveguide 520 and source cladding 525. Receiving optical device 510 may include a substrate 530, a reflective lensing region 532, cladding material 535, a lower reflective layer 540, a low index MMI region 542, a receiving waveguide 545, and an upper reflective layer 550.

As described above in relation to FIG. 1, source optical device 505, in one implementation, may include an optical chip assembly, such as a PIC. Source waveguide 505 may be formed of a dielectric material in the core of source optical device 505. Source waveguide 520 may be surrounded by source cladding 525 that is formed of materials having reflective indices lower than source waveguide 520, and where the peak optical intensity of source optical device 505 resides in source waveguide 520. Receiving optical device 510 may include an optical chip assembly, such as a PLC.

Source optical device 505 and receiving optical device 510 may be separated by gap 515. As described above, light emitted from source waveguide 520 may be diffracted an amount dictated by the width of gap 515 and any material included in gap 515. In one implementation, gap 515 may be filled with an epoxy or other bonding material used to fix the position of source optical device 505 relative to receiving optical device 510. In addition to diffraction caused by gap 515, the refractive index of the epoxy (or other filler) material (e.g., approximately 1.5) may also effect the diffraction of light emitted from source waveguide 520.

Relating to receiving optical device 510, substrate 530 may form a carrier onto which various dielectric layers of receiving optical device 510 may be deposited or grown during formation of receiving optical device 510. Substrate 530, for example, may include materials, such as silicon, quartz, or indium phosphide, or any combination thereof.

Reflective lensing region 532 may include a lower reflective layer 540, low index MMI region 542, and upper reflective layer 550. Reflective lensing region 532 may be formed to focus received light from source waveguide 520 onto receiving waveguide 545 as efficiently as possible by reflecting incident light within the reflective lensing region 532 using multimode interference (MMI).

Similar to source cladding 525, receiving cladding 535 and low index MMI region 542 may be formed of a material having a lower refractive index than receiving waveguide 545. For example, receiving cladding 535 may include silica, lower index silicon oxynitride, lower index silicon oxycarbide, indium phosphide, galium arsenide, lower index polymers, and other material suitable for making optical waveguides including combinations thereof.

Lower reflective layer 540 may be formed on a lower portion 555 of cladding material 535. Additional layers of cladding material 535 may be formed along with receiving waveguide 545 during formation of receiving optical device 510. For example, receiving waveguide 545 may be formed as a thin film of dielectric material, such as silica, indium phosphide, gallium arsenide, high index polymers, and other material suitable for making optical waveguides including combinations thereof. In one implementation, receiving waveguide 545 may have a refractive index of about 1.7.

Upper reflective layer 550 may be formed above receiving waveguide 545. In one exemplary implementation, lower reflective layer 540 and upper reflective layer 550 may be mirror layers formed of high-reflectivity metallic layers, such as gold or silver. In an alternative implementation, as shown in FIG. 6, lower reflective layer 540 and upper reflective layer 550 may include dielectric mirrors 600 and 610, respectively, formed by stacking high-index and low-index multilayers. A stack of high and low index materials that is used for waveguide confinement may be referred to as an ARROW (Anti-Resonant Reflecting Optical Waveguide). In practice, the number of layers may be determined by the degree of reflectivity desired and the index values for the high and low index layers.

It should be noted that, in the embodiment of FIG. 6, only one high index and one low index layer are shown for the bottom reflector 600. For bottom multilayer stack 600, substrate 530 may be used in conjunction with the high index and low index layers as a pre-existing high index layer to provide high reflectivity. This further simplifies fabrication of receiving optical device 510.

In the implementations of FIGS. 5 and 6, reflecting layers 540 and 550 (or stacks 600 and 610) need only extend from input facet 560 of optical receiving device 510 to receiving waveguide 545. Reflective layers 540 and 550 can be removed, for example by etching, over the rest of the receiving device 510.

The optimal height (H) and length (L) of reflective lensing region 532 may be determined such that Gaussian distributed light incident at end 560 of receiving optical device 510 may be focused into its fundamental mode at input end 565 of receiving waveguide 545. In one exemplary implementation, a suitable height and length of reflective lensing region 532 may be determined by performing a numerical modeling analysis of a proposed configuration.

Figure 7:
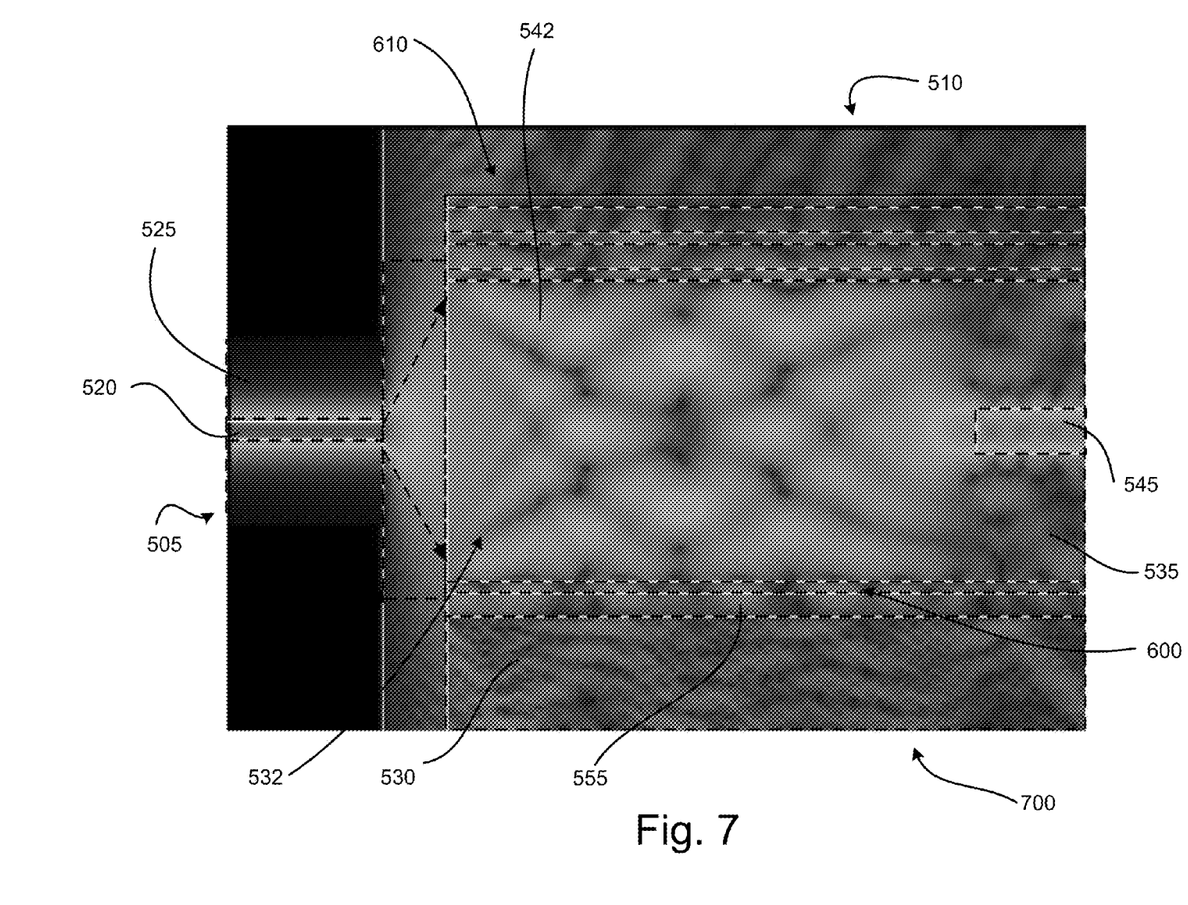
FIG. 7 illustrates a side view of simulation results corresponding to an exemplary embodiment of the optical interface assembly of FIG. 6.

FIG. 7 illustrates a top view of simulation results 700 corresponding to optical interface assembly 500 as illustrated in FIG. 6. For purposes of explanation, the structure of a resulting optical interface assembly 500 that conforms to simulation results 700 has been superimposed in dashed lines over simulation results 700.

In the example of FIG. 7, source waveguide 520 has a height of 1.0 μm and a refractive index of 3.35. Gap region 115 has refractive index of 1.5 and a width of about 10 μm. Substrate 530 has a refractive index of 3.5. Reflective lensing region 532 has a height of 8 μm, with low index MMI region 542 having a refractive index of 1.45. High index layers in stacks 600 and 610 may have refractive indices of 1.7. All other portions of the receiving cladding material may have a refractive index of 1.45 (e.g., surrounding receiving waveguide 545 and in between the high index layers in stacks 600 and 610). Receiving waveguide 545 has a refractive index of 1.70 and a height of 1.5 μm. The optical wavelength used in the simulation is 1.55 μm.

As shown in FIG. 7, simulation results 700 demonstrate that a fundamental mode of the light received by reflective lensing region 532 is focused at a length of about 50 μm. Accordingly, reflective lensing region 532 may be coupled to receiving waveguide 545 at a length of 50 μm, thereby focusing a majority of the optical power to receiving waveguide 545. In the example of FIGS. 2A and 2B, approximately 80% of the optical power is transferred from source waveguide 520 to receiving waveguide 545.

By providing for the focusing of incident light to a receiving waveguide using multimode interference, the optical interfaces described herein are highly efficient and tolerant of installation/manufacturing variances, such as vertical alignment and gap width and are highly efficient, resulting in 80% or more of the incident optical power being transmitted to the receiving waveguide.

In one implementation, a receiving optical device may be provided with a high index multimode interference (MMI) lens assembly having dimensions suitable for focusing a fundamental mode of light incident thereon. In another implementation, a receiving optical device may be provided with a reflective lensing region that includes opposing layers of reflective materials or dielectric mirrors formed by stacking high-index and low-index multilayers. The MMI lens assembly or reflective lensing region operates to focus a fundamental mode of incident light onto a receiving waveguide with high efficiency.

The foregoing description of exemplary embodiments provides illustration and description, but is not intended to be exhaustive or to limit the invention to the precise form disclosed. Modifications and variations are possible in light of the above teachings or may be acquired from practice of the invention.

For example, while various exemplary implementations have been described above with respect to FIGS. 2A, 2B, 3A, 3B, 4, and 7, these descriptions are not limiting and any suitable combination of elements and/or dimensions may be used without departing from the scope and spirit of the described embodiments.

Even though particular combinations of features are recited in the claims and/or disclosed in the specification, these combinations are not intended to limit the disclosure of the invention. In fact, many of these features may be combined in ways not specifically recited in the claims and/or disclosed in the specification.

No element, block, or instruction used in the present application should be construed as critical or essential to the implementations described herein unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. An optical device, comprising:
 a first waveguide having an end portion configured to receive an optical signal, the optical signal having a fundamental mode, the first waveguide including a first material;
 a second waveguide having an end portion, the second waveguide including a second material;
 a gap including a third material different than the first and second materials, the end portion of the first waveguide being separated from the end portion of the second waveguide by the gap, such that the end portion of the second waveguide supplies the optical signal to the end portion of the first waveguide via the gap,
 where the first waveguide is configured such that the optical signal undergoes multimode interference to focus the fundamental mode at the end portion of the second waveguide;
 a cladding layer;
 a lower reflector;
 a low index multimode interference layer formed above the lower reflector; and
 an upper reflector formed above the low index multimode interference region.

2. The device of claim 1, wherein the cladding layer surrounds the first waveguide, and the second waveguide has a refractive index different from refractive index of a source waveguide included in a source optical device that generates the optical signal, and where the first cladding layer has a refractive index lower than the refractive index of the second waveguide.

3. The device of claim 1, where the first waveguide has a refractive index substantially identical to the refractive index of the second waveguide.

4. The device of claim 3, wherein a source waveguide is included in a source optical device that generates the optical signal, the cladding layer surrounds the first waveguide, and a length of the gap is determined based on a height of the first waveguide, the refractive index of the first waveguide, the refractive index of the source waveguide, the refractive index of the second waveguide, the refractive index of the cladding layer, and a width of the gap.

5. The device of claim 4, where the gap includes a gap filling material.

6. The device of claim 3, where a length of the gap is determined based on a numerical simulation.

7. The device of claim 1, where the low index multimode interference layer has a refractive index lower than the refractive index of the first waveguide.

8. The device of claim 1, where the low index multimode interference layer has a refractive index substantially similar to the refractive index of the cladding layer.

9. The device of claim 1, where the upper reflector and the lower reflector comprise reflective metallic materials.

10. The device of claim 1, where the upper reflector and the lower reflector comprise gold or silver.

11. The device of claim 1, where the upper reflector and the lower reflector comprise dielectric mirrors.

12. The device of claim 1, where the upper reflector and the lower reflector comprise alternating layers of high refractive index material and low refractive index material.

13. The device of claim 12, wherein the cladding surrounds the first waveguide, and the high refractive index material has a refractive index substantially identical to a refractive index of the second waveguide and where the low refractive index material has a refractive index substantially identical to a refractive index of the cladding layer.

14. The device of claim 1, wherein the cladding surrounds the first waveguide, a length of the gap is determined based on a height of the low index multimode interference layer, the refractive index of the low index multimode interference region; a reflectivity of the upper reflector, a reflectivity of the lower reflector, the refractive index of the second waveguide, the refractive index of the cladding layer, and a width of the gap.

15. The device of claim 1, where the optical device comprises a planar lightwave circuit (PLC) and where the source optical device comprises a photonic integrated circuit (PIC).

16. A device, comprising:
a planar lightwave circuit (PLC) having an input end for receiving light from a source optical device, the PLC comprising:
a substrate;
a first cladding layer formed on the substrate;
a first reflective layer formed on the first cladding layer;
a multimode interference portion formed on the first reflective layer and having an input end and an output end, where the input end of the multimode interference region is configured to receive an optical signal, and where the multimode interference portion has an output end that supplies a portion of the optical signal, where the multimode interference portion has a height and a length, the multimode interference portion including a first material;
a first waveguide provided on the first cladding layer, the first waveguide being configured to receive the portion of the of the optical signal, where the first waveguide has a refractive index higher than a refractive index of the multimode interference portion;
a second reflective layer formed on the multimode interference portion; and
and a second cladding layer provided on the first waveguide;
a second waveguide including a second material; and
a gap including a third material different than the first and second materials, the input end of the multimode interference portion being separated from the second waveguide by the gap, such that the second waveguide supplies the optical signal to the input end of the multimode interference portion via the gap.

17. The device of claim 16, where the first reflective layer and the second reflective layer comprise reflective metallic layers.

18. The device of claim 16, where the first reflective layer and the second reflective layer comprise dielectric mirrors.

19. The device of claim 18, where the dielectric mirrors comprise alternating layers of high refractive index material and low refractive index material.

20. The device of claim 16, where at least one of the height of the multimode interference portion and the length of the multimode interference portion are determined based the refractive index of the multimode interference region, the refractive index of the first waveguide, a reflectivity of the first reflective layer, a reflectivity of the second reflective layer, a refractive index of the first cladding layer, and a refractive index of the second cladding layer.

21. The device of claim 16, where the length of the multimode interference portion corresponds to a focal point of a fundamental mode of the optical signal.

* * * * *